United States Patent
Sang et al.

(10) Patent No.: US 10,222,666 B2
(45) Date of Patent: Mar. 5, 2019

(54) ARRAY SUBSTRATE, DISPLAY APPARATUS AND METHOD FOR REPAIRING FAULT OF ARRAY SUBSTRATE

(71) Applicants: BOE TECHNOLOGY GROUP CO., LTD., Beijing (CN); BEIJING BOE DISPLAY TECHNOLOGY CO., LTD., Beijing (CN)

(72) Inventors: Qi Sang, Beijing (CN); Bo Feng, Beijing (CN)

(73) Assignees: BOE Technology Group Co., Ltd., Beijing (CN); Beijing BOE Display Technology Co., Ltd., Beijing (CN)

(*) Notice: Subject to any disclaimer, the term of this patent is extended or adjusted under 35 U.S.C. 154(b) by 134 days.

(21) Appl. No.: 15/307,239

(22) PCT Filed: Feb. 2, 2016

(86) PCT No.: PCT/CN2016/073142
§ 371 (c)(1),
(2) Date: Oct. 27, 2016

(87) PCT Pub. No.: WO2017/054385
PCT Pub. Date: Apr. 6, 2017

(65) Prior Publication Data
US 2017/0269446 A1    Sep. 21, 2017

(30) Foreign Application Priority Data
Sep. 28, 2015   (CN) .......................... 2015 1 0626950

(51) Int. Cl.
*G02F 1/1362* (2006.01)
*G06F 3/044* (2006.01)
(Continued)

(52) U.S. Cl.
CPC ...... *G02F 1/136259* (2013.01); *G02F 1/1333* (2013.01); *G02F 1/1362* (2013.01);
(Continued)

(58) Field of Classification Search
None
See application file for complete search history.

(56) References Cited

U.S. PATENT DOCUMENTS

2010/0214503 A1* 8/2010 Lee ................... G02F 1/136259
                                                     349/54
2014/0104251 A1* 4/2014 Zhang ................ G09G 3/3611
                                                    345/205
(Continued)

FOREIGN PATENT DOCUMENTS

CN    101470228 A    7/2009
CN    101470288      7/2009
(Continued)

OTHER PUBLICATIONS

Written Opinion of the International Searching Authority from corresponding PCT Application No. PCT/CN2016/073142, dated Jul. 1, 2016 (4 pages).
(Continued)

*Primary Examiner* — Joseph R Haley
*Assistant Examiner* — Emily J Frank
(74) *Attorney, Agent, or Firm* — Harness, Dickey & Pierce, P.L.C.

(57) ABSTRACT

The present disclosure discloses an array substrate, a display apparatus and a method for repairing faults of an array substrate, which belong to the field of display technologies. The array substrate comprises: a plurality of touch electrode lines, a plurality of data lines and a plurality of repair lines, wherein the plurality of touch electrode lines are intersected with and insulated from the plurality of data lines and the
(Continued)

plurality of repair lines, and a repair line is parallel to a data line. The repair line is connected to parts on both sides of a disconnected position of the data line when the data line is disconnected. In embodiments of the present disclosure, when a data line in the array substrate is disconnected, the disconnected data line may be replaced by a repair line, thereby achieving repairing the disconnected data line and ensuring a display quality and a touch function of a display device.

17 Claims, 2 Drawing Sheets

(51) Int. Cl.
*G06F 3/041* (2006.01)
*G02F 1/1333* (2006.01)
*G02F 1/1343* (2006.01)

(52) U.S. Cl.
CPC .... *G02F 1/13338* (2013.01); *G02F 1/134309* (2013.01); *G02F 1/136286* (2013.01); *G06F 3/044* (2013.01); *G06F 3/0412* (2013.01); *G02F 2001/136263* (2013.01)

(56) References Cited

U.S. PATENT DOCUMENTS

2016/0170544 A1\* 6/2016 Wang .................. G06F 3/0416
    345/173
2016/0291776 A1 10/2016 Li et al.

FOREIGN PATENT DOCUMENTS

| CN | 101666948 A | 3/2010 |
| CN | 102169267 A | 8/2011 |
| CN | 104698708   | 6/2015 |
| CN | 105116590 A | 12/2015 |
| JP | 2000276296 A | 10/2000 |
| JP | 2008151987 A | 7/2008 |

OTHER PUBLICATIONS

Office Action from corresponding Chinese Application No. 201510626950 dated Sep. 30, 2017 (9 pages).

\* cited by examiner

ARRAY SUBSTRATE, DISPLAY APPARATUS AND METHOD FOR REPAIRING FAULT OF ARRAY SUBSTRATE

This application claims the benefit and priority of Chinese Patent Application No. 201510626950.X filed Sep. 28, 2015. The entire disclosure of the above application is incorporated herein by reference.

TECHNICAL FIELD

The present disclosure generally relates to the field of display technologies, and more particularly, to an array substrate, a display apparatus and a method for repairing fault of an array substrate.

BACKGROUND

With constant progress of flat panel display technologies, a growing number of display devices are equipped with touch screens. For example, touch screens have been used in display devices such as notebook computers, monitors and television sets, etc. Users may perform touch operations on devices equipped with touch screens. At present, according to working principles of touch screens and media for transmitting information, touch screens may be classified into four types: resistive touch screens, capacitive sensing touch screens, infrared touch screens and surface acoustic wave touch screens respectively. The resistive touch screens and the capacitive sensing touch screens are more widely used. For the capacitive sensing touch screens, as a final solution to touch and display, an in cell touch technology implements one-stop seamless production, really integrates a touch panel and a liquid crystal display (LCD), and has the advantages of integration, lightening and thinning, low cost, low power consumption, high image quality and multi-touch, thus becoming a new development direction in the future.

At present, limited by film formation quality, environmental cleanliness, scratching and other factors, a data line supplying power to a pixel electrode may be disconnected. When a data line is disconnected, display and touch functions of a touch screen panel will be severely affected, and a display quality and a touch function of a display device are greatly reduced. Therefore, how to repair a disconnected data line becomes a next research hotspot at present.

SUMMARY

Embodiments of the present disclosure provide an array substrate, a display apparatus and a method for repairing an array substrate.

According to a first aspect of the present disclosure, there is provided an array substrate, including: a plurality of touch electrode lines, a plurality of data lines and a plurality of repair lines. The plurality of touch electrode lines are intersected with and insulated from the plurality of data lines and the plurality of repair lines, and the plurality of repair lines are parallel to the plurality of data lines. The repair line is connected to parts on both sides of a disconnected position of the data line when the data line is disconnected.

In the embodiments of the present disclosure, when the data line is disconnected, the repair line is connected to a first touch electrode line and a second touch electrode line on both sides of the disconnected position, and the data line is connected to the first touch electrode line and the second touch electrode line.

In the embodiments of the present disclosure, the data line is connected to the first touch electrode line at a first intersection position and is connected to the second touch electrode line at a third intersection position. The repair line is connected to the first touch electrode line at a second intersection position and is connected to the second touch electrode line at a fourth intersection position.

In the embodiments of the present disclosure, the first touch electrode line has a first cut-off point and a second cut-off point. The first intersection position and the second intersection position are positioned between the first cut-off point and the second cut-off point.

In the embodiments of the present disclosure, the second touch electrode line has a third cut-off point and a fourth cut-off point. The third intersection position and the fourth intersection position are positioned between the third cut-off point and the fourth cut-off point.

In the embodiments of the present disclosure, the repair line has a fifth cut-off point and a sixth cut-off point. The second intersection position and the fourth intersection position are positioned between the fifth cut-off point and the sixth cut-off point.

In the embodiments of the present disclosure, the array substrate further includes a plurality of sub-electrode blocks and a plurality of via holes. The repair line is connected to the sub-electrode block through the via hole. The plurality of sub-electrode blocks are used as touch electrodes in a touch stage and used as common electrodes in a display stage.

In the embodiments of the present disclosure, the repair line is reused as a touch electrode line.

In the embodiments of the present disclosure, the repair line and the data line are disposed on an identical layer.

In the embodiments of the present disclosure, the repair line and the data line are disposed in an overlapping way.

According to a second aspect of the present disclosure, there is provided a display apparatus, including the array substrate described above.

According to a third aspect of the present disclosure, there is provided a method for repairing faults of an array substrate, which is applied to the array substrate, including: connecting the repair line to parts on both sides of a disconnected position of the data line when the data line is disconnected.

In the embodiments of the present disclosure, when the data line is disconnected, the repair line is connected to a first touch electrode line and a second touch electrode line on both sides of the disconnected position, and the data line is connected to the first touch electrode line and the second touch electrode line.

In the embodiments of the present disclosure, the data line is connected to the first touch electrode line at a first intersection position and is connected to the second touch electrode line at a third intersection position. The repair line is connected to the first touch electrode line at a second intersection position and is connected to the second touch electrode line at a fourth intersection position.

In the embodiments of the present disclosure, the first touch electrode line has a first cut-off point and a second cut-off point. The first intersection position and the second intersection position are positioned between the first cut-off point and the second cut-off point. The method includes: cutting the first touch electrode line off at the first cut-off point and the second cut-off point respectively.

In the embodiments of the present disclosure, the second touch electrode line has a third cut-off point and a fourth cut-off point. The third intersection position and the fourth intersection position are positioned between the third cut-off point and the fourth cut-off point. The method includes: cutting the second touch electrode line off at the third cut-off point and the fourth cut-off point respectively.

In the embodiments of the present disclosure, the repair line is connected to the first touch electrode line and the second touch electrode line by welding and the data line is connected to the first touch electrode line and the second touch electrode line by welding.

In the embodiments of the present disclosure, the repair line has a fifth cut-off point and a sixth cut-off point. The second intersection position and the fourth intersection position are positioned between the fifth cut-off point and the sixth cut-off point. The method includes: cutting the repair line off at the fifth cut-off point and the sixth cut-off point respectively.

In the embodiments of the present disclosure, using a touch electrode line and a repair line as repairing means, when a data line in the array substrate is disconnected, the disconnected data line may be replaced by a repair line, thereby achieving repairing the disconnected data line and ensuring a display quality and a touch function of a display device.

BRIEF DESCRIPTION OF THE DRAWING

To describe the technical solutions in the embodiments of the present disclosure more clearly, the following will briefly introduce the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION

To make the objectives, technical solutions, and advantages of the embodiments of the present disclosure clearer, the following clearly and completely describes the technical solutions in the embodiments of the present disclosure with combination of the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

Figure 1:
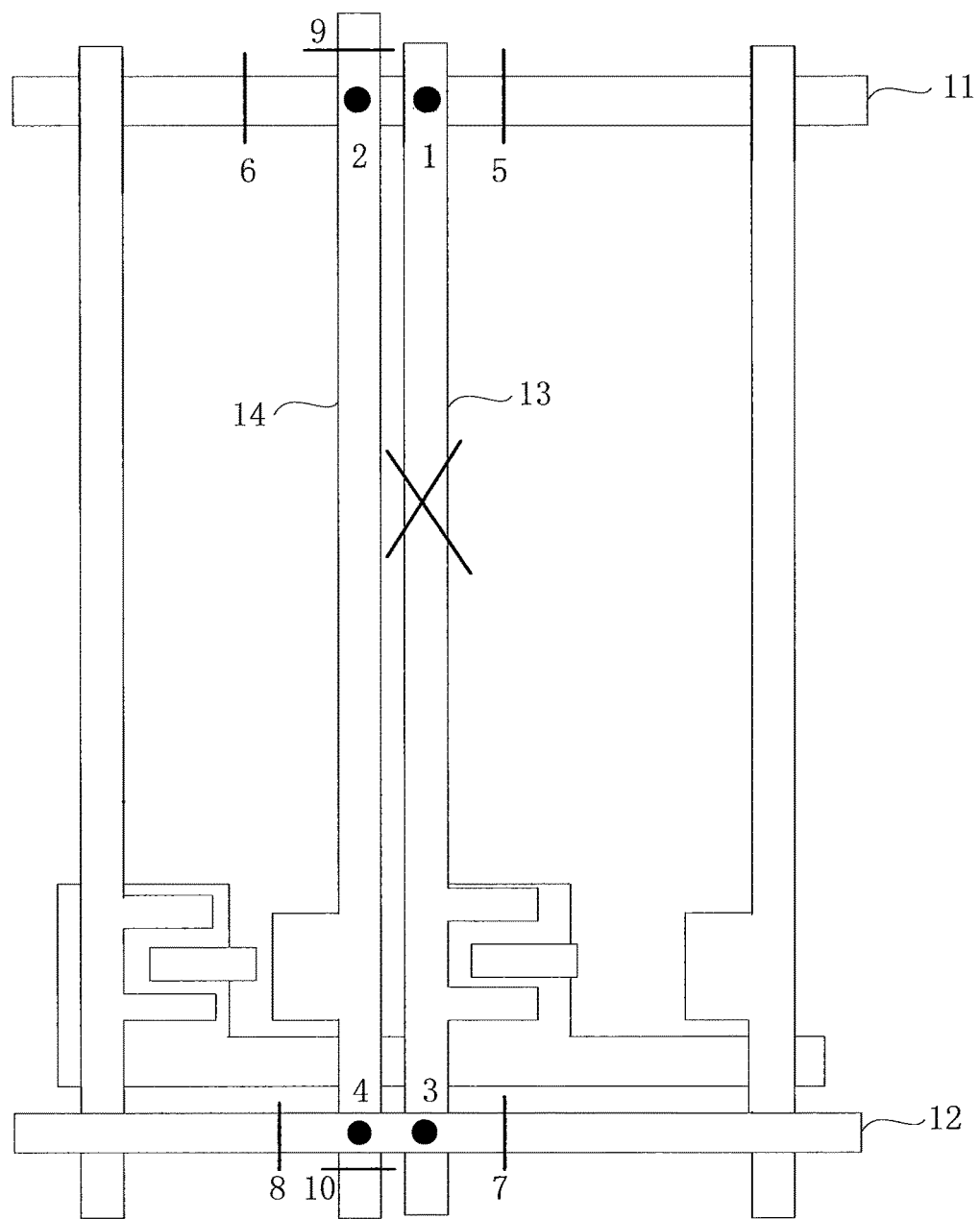
FIG. 1 is a schematic diagram of a local structure of an array substrate according to a first embodiment of the present disclosure.

FIG. 1 is a schematic diagram of a local structure of an array substrate according to a first embodiment of the present disclosure. Referring to FIG. 1, the array substrate includes: a plurality of touch electrode lines 11 and 12, a plurality of data lines 13 and a plurality of repair lines 14. The plurality of touch electrode lines 11 and 12 are intersected with and insulated from the plurality of data lines 13 and the plurality of repair lines 14, and the plurality of repair lines 14 are parallel to the plurality of data lines 13. The repair line 14 is connected to parts on both sides of a disconnected position of the data line 13 when the data line 13 is disconnected. In the embodiments of the present disclosure, an objective of arranging the repair line 14 and the data line 13 in parallel is that once the data line 13 has a cut-off point, the repair line 14 may be used to repair it. Therefore, the repair line 14 and the data line 13 are only needed to be disposed substantially in parallel instead of two straight lines strictly in parallel. A certain angle may be formed between the repair line 14 and the data line 13 partially or wholly, and the repair line 14 and the data line 13 may also be set as other shapes except straight lines according to demands. During repairing, what is needed is that the repair line 14 is connected to the data line 13 by welding or by other means.

The plurality of touch electrode lines 11 and 12 include a first touch electrode line 11 on one side of a disconnected position and a second touch electrode line 12 on the other side of the disconnected position. The data line is intersected with the first touch electrode line at a first intersection position and is intersected with the second touch electrode line at a third intersection position. The repair line is intersected with the first touch electrode line at a second intersection position and is intersected with the second touch electrode line at a fourth intersection position. When the data line is disconnected, the first touch electrode line 11 is connected to the repair line 14 and the data line 13, and the second touch electrode line 12 is connected to the repair line 14 and the data line 13. Compared with a direct repair by using the repair line 14, using the touch electrode lines 11 and 12 may allow a larger distance to be kept between the repair line 14 and the data line 13, which is advantageous to reducing interference.

The repair line 14 and the data line 13 may be disposed at an identical layer to reduce the quantity of circuit layers. In addition, out of consideration for improving an aperture ratio and other aspects, the repair line 14 and the data line 13 may be disposed in an overlapping way, namely, the repair line 14 may be disposed directly above or directly below the data line 13. In addition to replacing the disconnected data line when the data line is disconnected, the repair line 14 may be reused as a touch electrode line when the data line is in a normal operation state. The "reused" herein means that the repair line 14 may be separately used as a touch electrode line or the repair line 14 may be used as a back-up of the existing touch electrode line.

Referring to FIG. 1, when the data line 13 is in a normal operation state, the data line 13 is respectively insulated from and intersected with the first touch electrode line 11 and the second touch electrode line 12, and the repair line 14 is respectively insulated from and intersected with the first touch electrode line 11 and the second touch electrode line 12. The first touch electrode line 11 may be positioned below the data line 13 and the repair line 14, and the second touch electrode line 12 may be positioned above the data line 13 and the repair line 14. Both the first intersection position 1 of the data line 13 and the first touch electrode line 11 and the second intersection position 2 of the repair line 14 and the first touch electrode line 11 are respectively provided with an insulation layer, thereby implementing the described insulation and intersection. Similarly, both the third intersection position 3 of the data line 13 and the second touch electrode line 12 and the fourth intersection position 4 of the repair line 14 and the second touch electrode line 12 are respectively provided with an insulating layer, thereby implementing the described insulation and intersection. In the embodiments of the present disclosure, after the data line 13 is disconnected, four welding operations are respectively performed on the first intersection position 1, the second intersection position 2, the third intersection position 3 and the fourth intersection position 4 so as to use the repair line 14 to replace the disconnected data line 13, thereby implementing repair of the disconnected data line (i.e. data open, DO).

In the embodiments of the present disclosure, as shown in FIG. 1, the first touch electrode line 11 has a first cut-off point 5 and a second cut-off point 6, and the second touch electrode line 12 has a third cut-off point 7 and a fourth cut-off point 8. Both the first intersection position 1 of the data line 13 and the first touch electrode line 11 and the second intersection position 2 of the repair line 14 and the first touch electrode line 11 are positioned between the first cut-off point 5 and the second cut-off point 6. Both the third intersection position 3 of the data line 13 and the second touch electrode line 12 and the fourth intersection position 4 of the repair line 14 and the second touch electrode line 12 are positioned between the third cut-off point 7 and the fourth cut-off point 8. After the data line 13 is disconnected, in addition to the four welding operations respectively performed on the first intersection position 1, the second intersection position 2, the third intersection position 3 and the fourth intersection position 4, to reduce a resistance value, cutting operations may also be performed at the first cut-off point 5, the second cut-off point 6, the third cut-off point 7 and the fourth cut-off point 8, respectively.

Referring to FIG. 1, the repair line 14 further includes a fifth cut-off point 9 and a sixth cut-off point 10. Both the second intersection position 2 of the repair line 14 and the first touch electrode line 11 and the fourth intersection position 4 of the repair line 14 and the second touch electrode line 12 are positioned between the fifth cut-off point 9 and the sixth cut-off point 10. Optionally, a cutting operation may be performed on the repair line 14 at the fifth cut-off point 9 and the sixth cut-off point 10 if the repair line 14 is just positioned inside a touch electrode. A cutting operation may be not performed on the repair line 14 at the fifth cut-off point 9 or the sixth cut-off point 10 if the repair line 14 is just a dummy line. In such a case, to make an image quality better, a cutting operation may be performed on the repair line 14 at the fifth cut-off point 9 and the sixth cut-off point 10, thereby implementing a DO repair. Cutting off the repair line 14 does not have a negative effect on a display function of a panel, and a touch function thereof may likely lose efficacy slightly only when the repair line 14 is reused as a touch electrode line. However, since touch electrodes and corresponding repair lines 14 are distributed quite densely, far beyond use demands, function failure of individual touch electrodes does not have a negative effect on implementation of the whole touch function. It is to be noted that the DO repairing method provided by the present disclosure may be used in a hypersonic advanced super dimension switch (HADS) display mode, and may also be used in an advanced super dimension switch (ADS) display mode. Of course, in addition to being used in the above two display modes, the repairing method provided by the present disclosure may be also used in other display modes, which is not specifically limited in the embodiments of the present disclosure.

Figure 2:
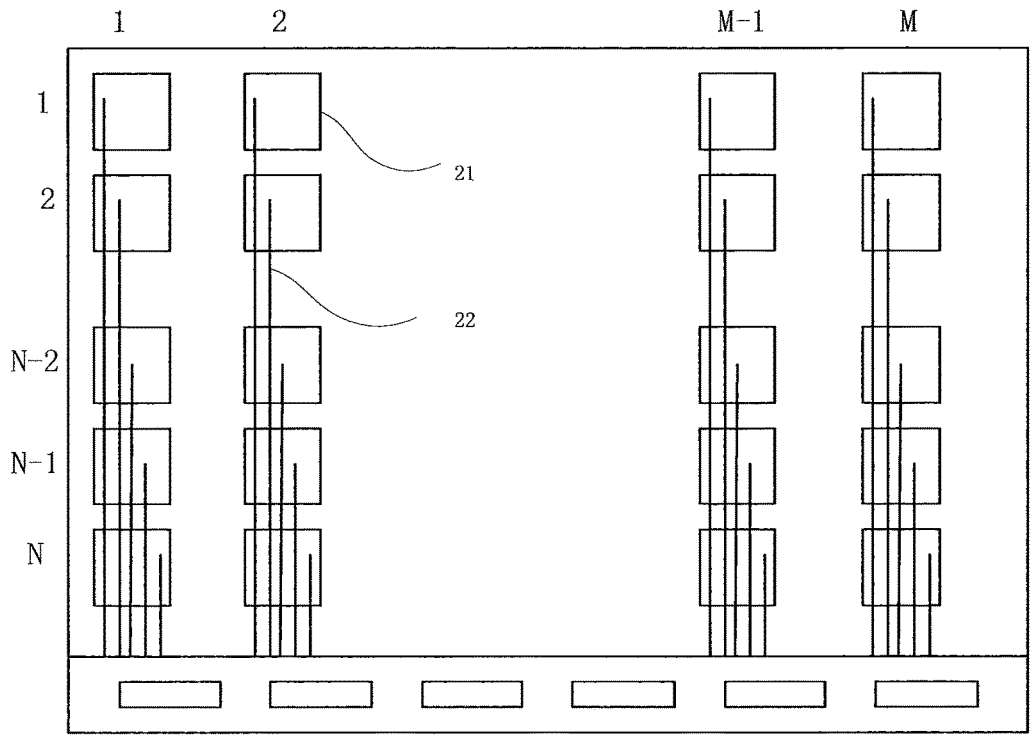
FIG. 2 is a schematic diagram of an overall structure of an array substrate according to the embodiment as shown in FIG. 1.

FIG. 2 is a schematic diagram of an overall structure of an array substrate according to the embodiment as shown in FIG. 1. In the embodiments of the present disclosure, the array substrate adopts a capacitive in cell touch pixel design and may be drived using a time-division driving method so that a display stage and a touch stage are separated so as to avoid signal interference. Referring to FIG. 2, touch electrodes of the array substrate adopt a region-division setting and includes a plurality of sub-electrode blocks 21. Each sub-electrode block 21 is multiplexed as a touch electrode and a common electrode in a time-division way, and each sub-electrode block 21 is connected to a drive unit of a display device. When the sub-electrode block 21 functions as the touch electrode, the drive unit controls the display device to implement touch sensing. When the sub-electrode block 21 functions as the common electrode, the drive unit controls the display device to display an image. When the data line 13 provides a data signal to a pixel electrode, neither the first touch electrode line 11 nor the second touch electrode line 12 has a signal input. This is the reason that in this example the touch electrode line is used to repair the data line.

As shown in FIG. 2, the repair line 22 is cut off partly inside the array substrate according to a distribution of touch electrodes, and touch electrode lines in the periphery of the array substrate are not connected to a display area. The touch electrode line and the repair line 14 are used as means for repairing data open (DO) of the data line 13. In addition, when the repair line 22 is reused as a touch signal line, in the display stage and the touch stage, the repair line 22 is connected to the plurality of sub-electrode blocks 21 in a touch electrode coverage area through via holes (not shown in FIG. 2), thereby implementing the repair line 22 transmitting touch signals through the via holes. Repair lines 22 in other regions are cut off and used as dummy lines. When the data line 13 in FIG. 1 is disconnected, the DO repair can be implemented through the repair line 14 in FIG. 1 being respectively connected to the first touch electrode line 11 and the second touch electrode line 12 by multiple welding operations and cutting operations.

The array substrate provided by the embodiments of the present disclosure is provided with repair lines, and uses the touch electrode line and the repair line as repairing means, when a data line in the array substrate is disconnected, the disconnected data line may be replaced by a repair line, thereby achieving repairing the disconnected data line and ensuring a display quality and a touch function of a display device.

According to a second embodiment of the present disclosure, there is further provided a display apparatus. The display apparatus includes the array substrate. The display apparatus may be any product or component having a display function, such as a mobile phone, a tablet computer, a TV set, a display, a notebook computer, a desktop computer, a digital photo frame, a navigation device and so on.

The display apparatus provided by the embodiments of the present disclosure is provided with repair lines, and uses a touch electrode line and a repair line as repairing means, when a data line in the array substrate is disconnected, the disconnected data line may be replaced by a repair line, thereby achieving repairing the disconnected data line and ensuring a display quality and a touch function of a display device.

Figure 3:
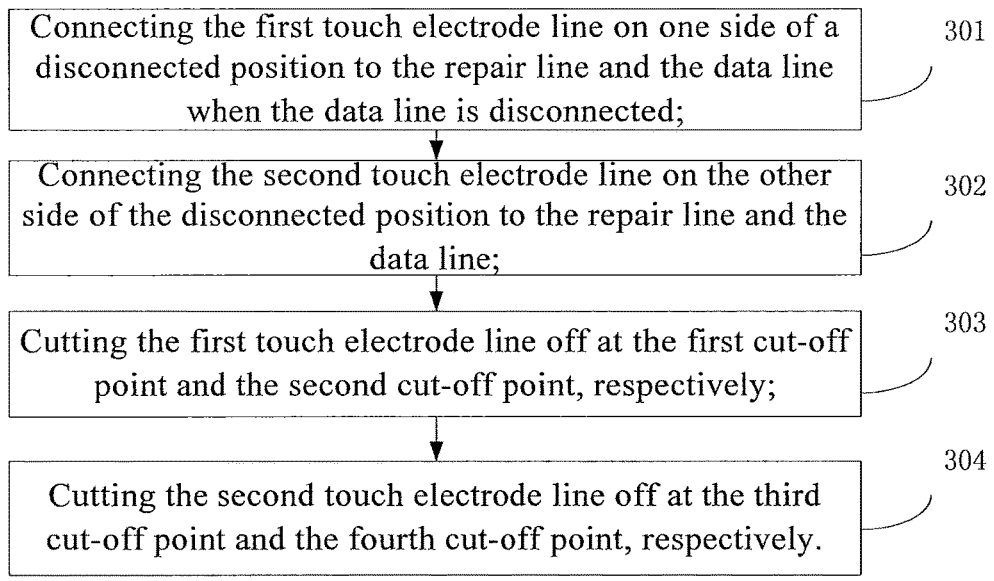
FIG. 3 is a flowchart of a method for repairing an array substrate according to a third embodiment of the present disclosure.

FIG. 3 is a flowchart of a method for repairing an array substrate according to a third embodiment of the present disclosure, which is applied to the foregoing array substrate. The method for repairing an array substrate includes: connecting the repair line with parts on both sides of a disconnected position of the data line when the data line is disconnected.

Referring to FIG. 3, the plurality of touch electrode lines include a first touch electrode line on one side of a disconnected position and a second touch electrode line on the other side of the disconnected position. The data line is intersected with the first touch electrode line at a first intersection position and is intersected with the second touch electrode line at a third intersection position. The repair line is intersected with the first touch electrode line at a second intersection position and is intersected with the second touch electrode line at a fourth intersection position. The method includes: connecting the first touch electrode line to the repair line and the data line when the data line is disconnected; and connecting the second touch electrode line with the repair line and the data line.

In the embodiments of the present disclosure, connecting the first touch electrode line at one end of a cut-off point with the repair line and the data line and connecting the second touch electrode line at the other end of the cut-off point with the repair line and the data line includes: performing a welding operation at the first intersection position so that the data line is welded with the first touch electrode line; performing a welding operation at the second intersection position so that the repair line is welded with the first touch electrode line; performing a welding operation at the third intersection position so that the data line is welded with the second touch electrode line; and performing a welding operation at the fourth intersection position so that the repair line is welded with the second touch electrode line. The welding may be performed by using for example laser welding equipment, ultrasonic welding equipment or impulse welding equipment and so on, which is not specifically limited in the embodiments of the present disclosure.

In the embodiments of the present disclosure, when the repair line has a fifth cut-off point and a sixth cut-off point and the second intersection position of the repair line and the first touch electrode line and the fourth intersection position of the repair line and the second touch electrode line are positioned between the fifth cut-off point and the sixth cut-off point, the method includes: cutting the repair line off respectively at the fifth cut-off point and the sixth cut-off point.

In the embodiments of the present disclosure, when the first touch electrode line has a first cut-off point and a second cut-off point and the first intersection position of the data line and the first touch electrode line and the second intersection position of the repair line and the first touch electrode line are positioned between the first cut-off point and the second cut-off point, the method includes: cutting the first touch electrode line off respectively at the first cut-off point and the second cut-off point.

In the embodiments of the present disclosure, when the second touch electrode line has a third cut-off point and a fourth cut-off point and the third intersection position of the data line and the second touch electrode line and the fourth intersection position of the repair line and the second touch electrode line are positioned between the third cut-off point and the fourth cut-off point, the method includes: cutting the second touch electrode line off respectively at the third cut-off point and the fourth cut-off point.

According to the method provided by the embodiments of the present disclosure, using a touch electrode line and a repair line as repairing means, when a data line in the array substrate is disconnected, the disconnected data line may be replaced by the repair line, thereby achieving repairing the disconnected data line and ensuring a display quality and a touch function of a display device.

It should be understood for those of ordinary skill in the art that some or all steps in the embodiments may be implemented by hardware, or by programs which may be stored in a computer readable storage medium. The storage medium mentioned above may be a red-only memory, a magnetic disc, an optical disc or the like.

The above descriptions are only for the preferred embodiments of the present disclosure, which are not used to limit the present disclosure. Various variations, identical substitutions and modifications made within the spirit and principles of the present disclosure shall be involved in the scope of the present disclosure.

What is claimed is:

1. An array substrate, comprising:
   a plurality of touch electrode lines including a first touch electrode line and a second touch electrode line;
   a plurality of data lines; and
   a plurality of repair lines; wherein:
   the plurality of touch electrode lines intersect the plurality of data lines and the plurality of repair lines, and are electrically insulated from the plurality of data lines and the plurality of repair lines when at least one of the data lines does not include a disconnected position;
   the plurality of repair lines are parallel to the plurality of data lines; and
   when the data line is disconnected, at least one of the repair lines is connected to the first touch electrode line and the second touch electrode line, the first touch electrode line and the second touch electrode line are located on opposite sides of the disconnected position of the data line, and the data line is connected to the first touch electrode line and the second touch electrode line.

2. The array substrate according to claim 1, wherein:
   the data line is connected to the first touch electrode line at a first intersection position and is connected to the second touch electrode line at a third intersection position; and
   the repair line is connected to the first touch electrode line at a second intersection position and is connected to the second touch electrode line at a fourth intersection position.

3. The array substrate according to claim 2, wherein:
   the first touch electrode line includes a first cut-off point and a second cut-off point; and
   the first intersection position and the second intersection position are positioned between the first cut-off point and the second cut-off point.

4. The array substrate according to claim 2, wherein:
   the second touch electrode line includes a third cut-off point and a fourth cut-off point; and
   the third intersection position and the fourth intersection position are positioned between the third cut-off point and the fourth cut-off point.

5. The array substrate according to claim 2, wherein:
   the repair line includes a fifth cut-off point and a sixth cut-off point; and
   the second intersection position and the fourth intersection position are positioned between the fifth cut-off point and the sixth cut-off point.

6. The array substrate according to claim 1, wherein:
   the array substrate further comprises a plurality of sub-electrode blocks and a plurality of via holes;
   the repair line is connected to the sub-electrode block through at least one of the via holes; and
   the plurality of sub-electrode blocks are used as touch electrodes in a touch stage and are used as common electrodes in a display stage.

7. The array substrate according to claim 6, wherein the repair line is reused as a touch electrode line.

8. The array substrate according to claim 1, wherein the repair line and the data line are disposed on an identical layer.

9. The array substrate according to claim 1, wherein the repair line and the data line overlap.

10. A method for repairing faults of the array substrate according to claim 1, the method comprising: connecting said at least one repair line to the first touch electrode line and the second touch electrode line on opposite sides of the disconnected position of the data line when the data line is disconnected.

11. The method according to claim 10, further comprising:
when the data line is disconnected, connecting the data line to the first touch electrode line at a first intersection position and to the second touch electrode line at a third intersection position;
wherein connecting said at least one repair line includes connecting said at least one repair line to the first touch electrode line at a second intersection position and to the second touch electrode line at a fourth intersection position.

12. The method according to claim 11, wherein:
the first touch electrode line includes a first cut-off point and a second cut-off point;
the first intersection position and the second intersection position are positioned between the first cut-off point and the second cut-off point; and
the method comprises: cutting the first touch electrode line at the first cut-off point and the second cut-off point.

13. The method according to claim 11, wherein:
the second touch electrode line includes a third cut-off point and a fourth cut-off point;
the third intersection position and the fourth intersection position are positioned between the third cut-off point and the fourth cut-off point; and
the method comprises: cutting the second touch electrode line at the third cut-off point and the fourth cut-off point.

14. The method according to claim 11, wherein:
said at least one repair line includes a fifth cut-off point and a sixth cut-off point;
the second intersection position and the fourth intersection position are positioned between the fifth cut-off point and the sixth cut-off point; and
the method comprises: cutting said at least one repair line at the fifth cut-off point and the sixth cut-off point.

15. The method according to claim 10, wherein said at least one repair line is connected to the first touch electrode line and the second touch electrode line by welding and the data line is connected to the first touch electrode line and the second touch electrode line by welding.

16. A display apparatus, comprising:
a display including an array substrate, the array substrate including a plurality of touch electrode lines, a plurality of data lines and a plurality of repair lines, the plurality of touch electrode lines including a first touch electrode line and a second touch electrode line; wherein:
the plurality of touch electrode lines intersect the plurality of data lines and the plurality of repair lines, and are electrically insulated from the plurality of data lines and the plurality of repair lines when at least one of the data lines does not include a disconnected position;
the plurality of repair lines are parallel to the plurality of data lines; and
when the data line is disconnected, at least one of the repair lines is connected to the first touch electrode line and the second touch electrode line, the first touch electrode line and the second touch electrode line are located on opposite sides of the disconnected position of the data line, and the data line is connected to the first touch electrode line and the second touch electrode line.

17. The display apparatus according to claim 16, wherein:
the data line is connected to the first touch electrode line at a first intersection position and is connected to the second touch electrode line at a third intersection position; and
said at least one repair line is connected to the first touch electrode line at a second intersection position and is connected to the second touch electrode line at a fourth intersection position.

* * * * *